United States Patent [19]
Bräutigam et al.

[11] Patent Number: 4,491,026
[45] Date of Patent: Jan. 1, 1985

[54] LIQUID FLOW METER

[75] Inventors: Rolf Bräutigam, Markt; Lothar Haas, Stein; Jürgen Wesemeyer, Nuremberg; Heinz-Dieter Hellmann, Grünstadt; Peter Hergt, Ludwigshafen; Reinhard Fassel, Oberasbach, all of Fed. Rep. of Germany

[73] Assignee: Robert Bosch GmbH, Stuttgart, Fed. Rep. of Germany

[21] Appl. No.: 432,997

[22] Filed: Sep. 29, 1982

[30] Foreign Application Priority Data

Oct. 2, 1981 [DE] Fed. Rep. of Germany ....... 3139218
Jun. 9, 1982 [DE] Fed. Rep. of Germany ....... 3221775

[51] Int. Cl.$^3$ ............................ G01F 1/05; G01F 5/00
[52] U.S. Cl. .................................. 73/861.86; 73/196; 73/202
[58] Field of Search ............ 73/861.79, 861.81, 861.82, 73/861.86, 113, 202, 203, 861.33, 196

[56] References Cited

U.S. PATENT DOCUMENTS

| | | | |
|---|---|---|---|
| 22,315 | 12/1858 | Siemens | 73/861.86 |
| 136,799 | 3/1873 | White | 73/861.86 |
| 316,614 | 4/1885 | Fredrick | 73/861.79 X |
| 2,030,381 | 2/1936 | Lowe | 73/861.86 |
| 3,867,840 | 2/1975 | Baatz | |
| 3,913,399 | 10/1975 | Sheeks | 73/861.86 |
| 4,140,009 | 2/1979 | Wolf et al. | 73/861.79 X |

FOREIGN PATENT DOCUMENTS

| | | | |
|---|---|---|---|
| 2911826 | 10/1980 | Fed. Rep. of Germany | |
| 452330 | 3/1913 | France | 73/861.82 |

Primary Examiner—Charles A. Ruehl
Attorney, Agent, or Firm—Frishauf, Holtz, Goodman & Woodward

[57] ABSTRACT

To measure a wide range of flow rates, and particularly such low flow rates as 0.5 liters per hour, while being able to accurately also measure rates of about 100 liters per hour, fluid is introduced axially into a rotor (14, 36, 40) which has outlet openings (24, 36, 45) positioned at their circumference, the rotor being rotated by reaction on the rotor upon fluid flow from the outlet openings. The rotor operates within a fluid flow chamber (15) from which is conducted outwardly through a duct positioned thereabove. Inflow of fluid may be guided for linear flow by guide ribs (13). The rotor may be a hollow disk-like structure (FIGS. 1-3) with spiral guide vanes therebetween, or a T-shaped tubular structure (FIGS. 4-6). If fuel consumption of an internal combustion engine is to be measured in which pressurized fluid is supplied to the engine and excess returned, two such flow meters can be combined on a common shaft, with respectively oppositely facing outlet openings (36, 45), so that differential flow only is being measured, hence accurately measuring fuel consumption by the engine. Rotation of the rotor is sensed by an electro-optical sensor (29, 37).

20 Claims, 6 Drawing Figures

LIQUID FLOW METER

The present invention relates to a liquid flow meter, and more particularly to a liquid flow meter capable of sensing extremely low flow rates.

BACKGROUND

Liquid flow meters are well known, and one such type of flow meter is described in U.S. Pat. No. 3,867,840, BAATZ, in which the liquid to be measured is supplied to a chamber in tangential direction. A rotor is retained within the chamber, the liquid being removed from the chamber in axial direction. The rotor carries vanes. As the fluid is introduced into the chamber, termed a swirl chamber, it impinges on the rotor vanes to rotate the rotor. Rotation is sensed by an optical-electrical evaluation device, the speed of the rotor, and the number of revolutions per unit time, determining the flow speed of the liquid, and hence the quantity of liquid being supplied.

The rotor has some inertia. Liquid which is in the chamber, and even after new liquid has been supplied, will continue to swirl therein, thus continuing further rotation of the rotor although no further liquid is being supplied. The structure necessarily requires some clearance between the vanes on the rotor and the walls of the swirl chamber, which permits some liquid to leak past the rotor. The accuracy of measurement at extremely low fluid flow, thus, is impaired by the possibility of such leakage from the inlet to the outlet duct in the swirl chamber.

It has also been proposed to locate a rotor directly within a fluid duct—see German Patent Disclosure Document DE-OS No. 29 11 826, WERKAMM. The rotor is essentially drum-shaped and is formed with helical ribs at its circumference. Axial ribs are located within the duct upstream from the rotor in order to direct the fluid flow in axial direction with respect to the rotor and to render it uniform. Fluid passing the rotor will meet the helical ribs, thus rotating the rotor.

The rotor, of course, must have some clearance within the duct in which it is retained and some of the fluid will flow along the duct without contacting the ribs of the rotor. For extremely low flow quantities, the measuring results, therefore, will not be accurate, and the fluid meter will not only be non-linear but may give random outputs not in accordance with actual flow. Further, if flow is stopped, the rotor will continue to run on for some time, so that the run-out of the rotor also will cause measurement errors.

THE INVENTION

It is an object to provide a liquid flow meter which has a wide operating range, so that even extremely small flow quantities can be measured accurately, and in which interruption of liquid flow will cause a zero or null signal, without run-on of a rotating element. The flow quantity may, for example, be flow of fuel to an internal combustion engine which, as well known, is extremely small when the engine operates under idling conditions. The flow meter should be capable of measuring the flow and variations thereof under engine idling.

Briefly, a rotor is located within a flow circuit which is so arranged that the inlet duct supplies liquid to the rotor in the region of the axis of the rotor, the outlet duct receiving liquid from exit openings at the circumference of the rotor, and forming an outlet duct chamber surrounding the rotor, preferably so constructed that two diametrically oppositely positioned outlet ducts emanate from the openings, leaving in approximately tangential direction.

In accordance with a feature of the invention, two rotors may be located on a single shaft, with one rotor receiving liquid from a supply source, and the second rotor, associated with a second exit chamber, receiving liquid which is returned from a utilization source, the difference between fluid flow being a measure of utilization of the liquid. The directions of rotation of the two rotors are in opposite sense, and the exit openings, preferably, of the second rotor are directed oppositely to those of the first.

For calibration, a bypass can be provided in accordance with a feature of the invention, which has a variable cross section, for example by arranging a slit or diaphragm with a suitable opening, so that operation of the rotor can be calibrated with respect to total flow to be sensed.

The flow meter has the advantage that, by directing flow from centrally of the rotor outwardly, the rotor is rotated only by the reaction force of the liquid leaving the rotor. Since even very small flow quantities must emanate or exit from the rotor openings, even the smallest flow will cause reactive forces to act on the rotor, so that extremely low liquid flow per unit time can be measured with high accuracy. Rotation of the rotor itself can be sensed by any suitable and well known opto-electric or electromagnetic evaluation device. Thus, instantaneous fuel consumption in an automotive engine, particularly when directly installed in an automotive vehicle, as well as determination of total fuel consumption, can be indicated.

The exit chamber which receives the liquid from the rotor can be so arranged that the liquid which exits from the rotor, at least in part, will flow in opposite direction to rotor rotation. Thus, run-on of the rotor after liquid flow has stopped is effectively braked by the fluid still present within the chamber and circulating in a direction opposite that of rotor rotation.

In accordance with a particularly suitable embodiment of the invention, the rotor is essentially disk-shaped, having two exit openings thereon and vanes or blades extending from the rotor axis to the respective openings, preferably in form of a spiral. This arrangement effectively prevents formation of turbulence of the liquid in the rotor, as well as gassing of the liquid, and the formation of gas bubbles. To obtain essentially uniform, linear flow in the liquid being supplied to the rotor, the rotor is preferably secured to a shaft which is located within the flow duct or channel leading fluid thereto. Guide ribs can be located on the inner wall of the supply channel. This arrangement is particularly suitable to effect braking of the rotor and prevent run-on, and especially so if the inner edges of the vanes or ribs are inclined with respect to the liquid duct.

Combining two flow meters together, for example two rotors in a common housing, provides a measure of fluid utilization, for example fuel utilized by a combustion engine, in which a portion of the fuel which is supplied and not utilized is returned to the supply source. In this system, a second line provides for the return flow. Placing two rotors in a coaxial arrangement permits locating the two rotors in a compact system in which the rotation of the rotors is opposite each other.

An adjustable bypass—if used—permits control of the rotor speed, and hence the number of pulses being emitted, for example by an opto-electronic scanner or the like, to limit the speed of the rotor to a predetermined maximum value. The inlet is then connected to the outlet by a bypass or calibration duct, bypassing passage of the fluid through the rotor. The cross section of the bypass can be changed, for example under servo control, which is also capable of providing output signals relating flow to rotor speed, if a given speed is known to result in a given flow under then adjusted and controlled bypass conditions.

DRAWINGS

DETAILED DESCRIPTION

Figure 1:
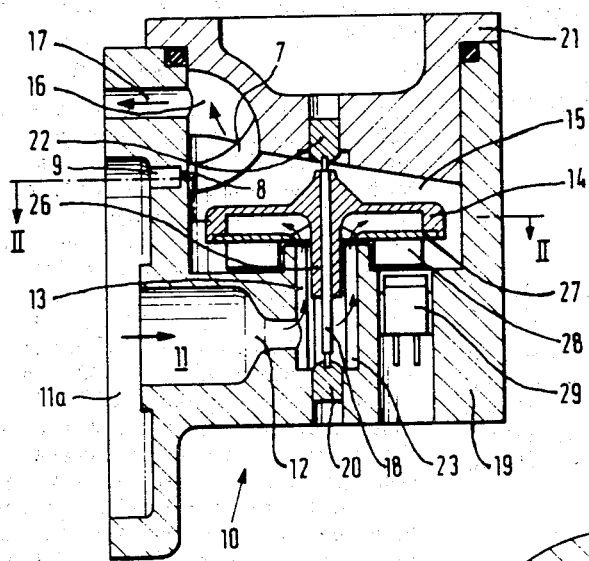
FIG. 1 is a longitudinal sectional view through the flow meter having a disk-shaped rotor.
Figure 2:
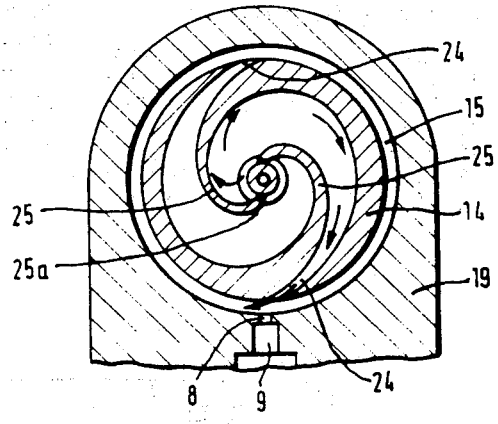
FIG. 2 is a cross section taken along line II—II which, it should be noted, is a broken section.
Figure 3:
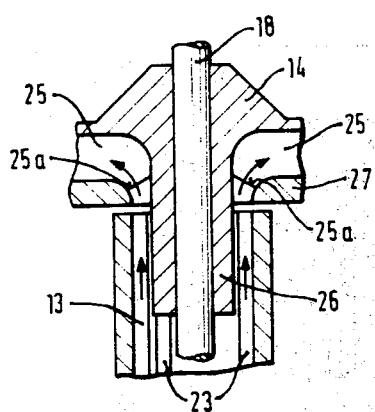
FIG. 3 is a fragmentary view through the central portion of the rotor, to an enlarged scale.

The flow meter of FIGS. 1-3 is specifically designed to sense fuel consumption in an internal combustion (IC) engine. The flow meter 10 can thus be included in the fuel supply line from a fuel tank to, for example, a carburetor or a fuel injection control apparatus of an IC engine. The fuel is supplied by a fuel pump, not shown, and flows through the flow meter 10. The flow direction of fuel is shown by arrows.

Fuel is first conducted to an inlet chamber 11, then via an inlet opening 12 into a flow duct 13. From flow duct 13, the fluid passes through a rotor 14 into a chamber 15. From chamber 15 it passes through an outlet opening 16 to the outlet duct or outlet connection 17.

The inlet chamber 11 is connected to a supply duct—not shown. The outlet duct 17 is connected to a removal line, likewise not shown. Any suitable connection, such as compression fittings or flanges, may be used. The rotor 14 is secured to a rotor shaft 18 which is rotatably fitted in a bearing 20 which closes off the lower end of the flow duct 13. The bearing 20 is fitted into the lower portion 19 of the housing retaining the flow meter 10.

The upper housing portion 21 of the flow meter 10 closes off the top of the chamber 15 towards the upper side of the flow meter. A second bearing 22 for the upper end of the rotor shaft 18 is secured in the upper portion 21 of the housing. The channel or duct 13 is shaped to provide uniformly directed, preferably essentially non-turbulent, flow in an axial direction with respect to the shaft. To obtain this uniform flow, three guide ribs 23 are formed in the inner portion of the duct 13, uniformly distributed throughout the circumference of the duct 13.

The rotor 14 is concentrically surrounded by the outflow chamber 15, as best seen in FIG. 2, which is a cross section of the flow meter along line II—II which, as seen in FIG. 1, is an offset section. Fluid flowing upwardly through the duct 13 is received within the rotor in the region of the rotor shaft. The fluid flows through the rotor and leaves by two exit openings 24 formed at the outer circumference of the rotor 14. Rotor 14 is essentially a circular disk. Upon leaving the rotor 14, the fluid will reach the outflow chamber 15. The openings 24 of the rotor are arranged to guide the fluid in essentially tangential direction, and they are, therefore, approximately tangentially placed. They are positioned at the outer circumference of the rotor 14 in diametrically opposite relation to each other, and extend in the same circumferential direction.

The rotor has two guide vanes 25 extending from the region of the rotor axis towards the outlet openings 24. The guide vanes 25 are located within the interior of the rotor—see FIG. 2—and are formed as a logarithmic spiral, defining a wider inner chamber and terminating at the narrow outlets 24. The shape of the vanes 25 is so arranged that the flow resistance is reduced and turbulence of the fluid passing through the rotor should be prevented.

Rotor 14 has a hub 26—see FIG. 3—with which it is secured to the rotor shaft 18. The hub 26 extends from the top into the flow duct 13. The guide ribs 23 are located in this region about the hub 26. The inner ends of the guide vanes 25 of the rotor 14 are located immediately thereabove. The inner edges 25a—see FIGS. 2 and 3—are chamfered or inclined in the direction towards the flow duct 13 in order to brake the rotor 14 at free running or idling. The rotor 14 is closed off at its bottom by a plate 27 which has uniformly distributed projections 28 in the form of lamellae or vanes which cooperate with an optoelectrical transducer 29 fitted into the bottom of the flow chamber 15, and transducing movement of the rotor 14 into electric pulses.

The inlet chamber 11 has a bypass calibration duct 9 communicating therewith which leads directly to the outflow chamber 15. The inlet chamber 11 is formed with an enlarged entry region 11a in order to compensate for pressure variations. The calibration duct 9 is located in communication with the pressure variation compensation region 11a. The duct 9 is formed with a slit 8 at the end facing the outlet flow chamber 15. The slit 8 may, for example, be about 2 mm and 0.2 mm wide. The slit can be, selectively, covered by a cover or diaphragm 7 extending from a wall of the chamber 15, and secured to the upper housing portion 21.

Operation: Liquid, the flow of which is to be metered, for example fuel supplied to an IC engine, upon being supplied, flows in the direction of the arrow to the inlet opening 12 into the flow duct 13. The liquid flow is straightened by the ribs 23, so that the liquid will rise upwardly in the axial direction of the rotor within the duct 13. The liquid is admitted to the rotor centrally, through an opening in the center, surrounding the rotor shaft in the region of the axis of rotation thereof, and hence the fluid will flow into the rotor, will flow along the guide vanes 25 and will exit at the outside of rotor 14 through the exit openings 24. The fuel flow will thus exert a force on the guide vanes 25, causing the rotor to rotate. The fluid coming from the exit openings 24 of the rotor then flows in a circumferential direction within the outflow chamber 15. The rotor 14 rotates in the opposite direction of fluid flow. The fluid then flows through the outlet opening 16 to leave the outflow chamber 15 through the outlet duct 17, and from then on to the fuel line.

Depending on the supply quantity, rotor 14 is rotated at, respectively, higher or lower speed. The opto-electronic transducer 29 provides an electrical pulse each time one of the ribs or lamellae 28 of the rotor plate passes the transducer 29. The pulse frequency, then, can be used as a measure of instantaneous fuel consumption of the IC engine, and displayed; summing the pulses will provide a measure of total fuel consumption and, if desired, remaining fuel within a tank can be indicated by subtracting the fuel used from tank capacity.

The pulse frequency, that is, the number of ribs or lamellae 28, is so fixed that flow meters which are even at the limit of manufacturing tolerances provide outputs even if the calibration bypass duct 9 is completely covered. Upon rotating the upper portion 21 of the flow meter 10, the diaphragm cover 7 is moved such that a portion of the slit 8 will be freed, that is, only a lesser portion of the slit 8 will be covered. A lesser quantity of fuel can thus be passed from the inlet entry region 11a to the outflow chamber 15 while bypassing the rotor 14 in a parallel fluid flow path. Upon constant through-flow, the rotor speed, thus, is decreased.

The output from the flow meter can thus be easily calibrated, since a predetermined flow rate can be matched to a predetermined pulse rate and, if the flow meter should not operate in accordance with the given criteria, rotation of the upper portion 21 can be used to more or less cover the slit 8, and thus calibrate the flow meter and positively relate the output frequency from transducer 29 to a given flow.

Gas bubbles, vapor bubbles, and other disturbances within the fuel may lead to erroneous measuring results if they reach the rotor 14. By installing the flow meter in a vertical position as shown in FIG. 1, with the chamber entry region 11a at the inlet, and placing the calibration duct 9 in the upper region of the chamber 11 or, rather, in the space of entry region 11a which forms a quieting chamber, and leaving the slit 8 open for at least a portion of the width thereof by suitable positioning of the covering strip of diaphragm 7, gas and other disturbances within the liquid can be bypassed and will not interfere with proper measuring results upon rotation of the rotor.

The flow meter can readily be made to measure such extremely small flow rates as, for example, ½ liter per hour, which is, for example, a fuel consumption of an IC engine upon idling; yet, the measuring range is extremely large, since the same meter can also accurately provide outputs of fuel consumption to 100 liters per hour, which may correspond to full load operation. The measuring results obtained are accurate both at the low as well as at the high end of through-put, with a range of 1:200.

It is particularly important that the rotor stop immediately when fuel flow stops, even though the rotor may have been running fast, and flow is suddenly interrupted. This is obtained, in accordance with the embodiment shown, by the external, and particularly outer circumferential shape of the rotor 14 and the shape of the outflow chamber 15. The fuel is ejected from the rotor 14 in a direction which is counter the direction of rotation of the rotor so that, if no additional flow should emanate from the rotor openings 24, the still present fluid circulating within the circumference of the rotor chamber will have a braking effect on the rotor as the still present fluid remains also in the outlet opening 16 which is located above the rotor in chamber 15. Additionally, the rotor 14 is braked by the projections 28 at the bottom side thereof, which are operating within the chamber 15, filled with fluid. An additional braking effect is obtained by the shape of the inclined edges 25a at the inner side of the vanes 25. Upon rotation of the rotor, with no fluid being supplied, the free-running rotor will cause turbulence within the fluid still present in the region about the rotor axis. This turbulence continues upstream within the duct 13 and is braked by the guide ribs 23. Thus, energy which would cause movement of the rotor is removed therefrom. The rotor, thus, is rapidly braked if the through-put or flow of fluid therethrough should stop. The still existing fluid within the flow meter then causes rapid braking.

Figure 4:
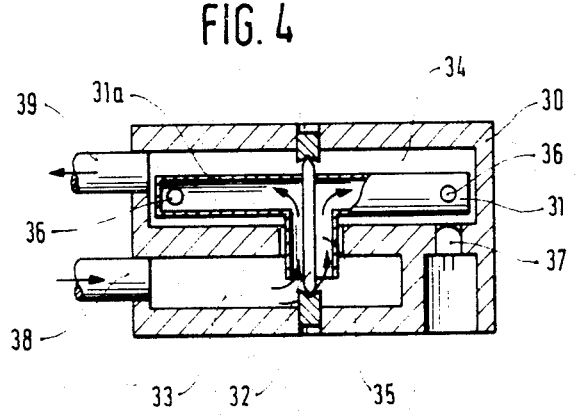
FIG. 4 is a longitudinal section illustrating another embodiment of the invention and using a tubular rotor.
Figure 5:
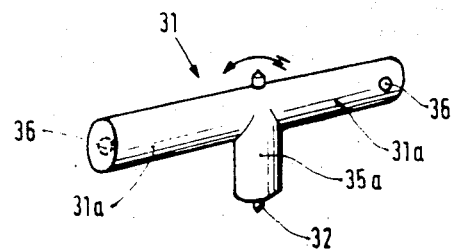
FIG. 5 is a perspective view of the rotor of FIG. 4.

Embodiment of FIG. 4: A flow meter 30 has a rotor 31 formed by a generally T-shaped tubular section, the opposite ends of which are closed. The rotor 31 is best seen in FIG. 5, and secured on a rotor shaft 32 which is retained in bearings positioned in the inlet chamber or duct 33 and in the outflow chamber 34. A flow duct 35 is formed by a tubular extension 35a surrounding the rotor shaft 32—see FIG. 4—to permit fluid to rise upwardly in axial direction as it flows through the flow meter. The fluid then divides, part moving in diametrical direction in the two sections 31a, which have outflow openings 36 tangentially arranged with respect to the outflow chamber 34 which, in plan view, is circular. The remaining portion of fluid passes through the other tubular section 31a, leaving by the other outlet 36, the two outlets 36 in the two sections 31a being located at respectively opposite directions.

The fluid, thus, leaves from the two outlet openings 36, and the rotor 31 is rotated within the outflow chamber 34 in the direction of the arrow as illustrated in FIG. 5 due to reactive forces acting on the rotor 31. An optoelectrical transducer 37 transmits rotation of the rotor into electrical signals to provide output indication for flow rate as well as flow quantity.

The inlet chamber 33 of the flow meter 30 is connected to a supply line 38 and the outflow chamber 34 to a removal line 39.

The rotor 30 is simple to construct; braking upon sudden disconnection of flow of fluid may not, however, be as effective as in the embodiment of FIGS. 1–3. Yet, such a flow meter can be used particularly desirably if the fluid is supplied from a fluid supply line to a consuming station, and the fluid which is not consumed therein is returned by a return line to a supply tank, for example.

Figure 6:
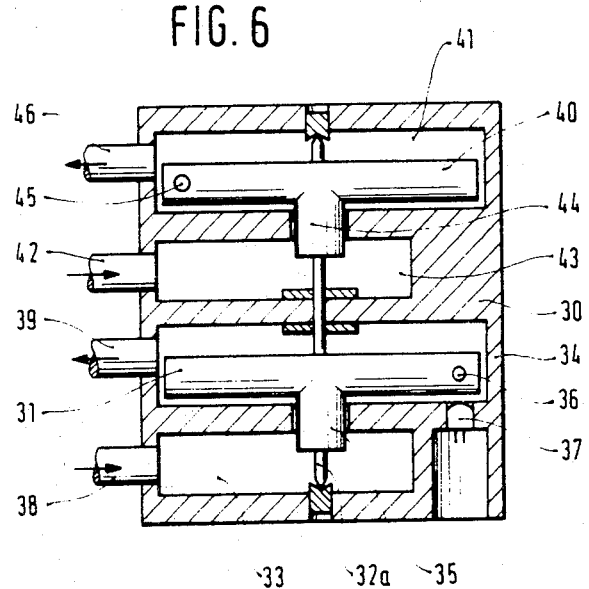
FIG. 6 is a vertical cross-sectional view through a tandem flow meter utilizing the embodiment of FIGS. 4 and 5, in which the rotors are located on a common shaft, and rotate in respectively opposite directions.

FIG. 6 illustrates an embodiment in which the construction of FIGS. 4 and 5 is particularly suitable. A second rotor 40 is located on the same rotor shaft 32a as the rotor 31. Fluid which is conducted through the inlet 38 and removed through outlet 39 is then conducted to a utilization or consumption station, with that quantity of fuel which is not consumed being conducted to the inlet chamber 43, and then through the flow duct 44 to the rotor 40. The fluid which has not been consumed is then conducted through the exit openings 45 of rotor 40 into the outflow chamber 41 and from there to the return line 46.

The outlet openings 45 on the tubular ends of the second rotor 40 are directed in opposite direction to the outlet openings of the first rotor 31. Thus, rotor 40—if it were independent—would operate in a direction of rotation counter that of rotor 31 upon flow of fluid thereto. Since both rotors 31 and 40 are secured to the same rotor shaft 32a, however, torques in opposite directions are effective on the shaft so that the entire system will measure the difference between the fluid passing through the rotor 31 and the fluid passing through the rotor 40. Assuming that the fluid in rotor 40 is less than that in rotor 31, the system will move in the direction of rotation of the rotor 31, as given by the position of its outlet openings 36. If no fluid, for example fuel to an IC engine is utilized, the supply and return flow quantity will be equal. The respectively reverse torques acting on the rotors 31 and 40 will cancel each other, and the overall system will stop immediately.

It is not necessary to recognize the direction of rotation of the rotors in any one of the embodiments; thus, the transducers 29, 37 need not specifically sense the direction of rotation of the rotor since the rotor, upon reversal of the flow direction, would merely stop.

Various changes and modifications may be made, and features described in connection with any one of the embodiments may be used with any of the others, within the scope of the inventive concept.

We claim:

1. Flow meter having
   a housing (10, 19, 21, 30);
   a fluid flow chamber (15, 34, 41) defined in the housing; a rotor (14, 31, 40) located in the housing;
   inlet means (11, 11a, 12; 33, 38; 42, 43) providing flow communication of fluid to the flow chamber;
   outlet means (16, 17; 39, 46) providing fluid outlet flow communication from the chamber;
   rotation sensing means (29, 37) sensing rotation of the rotor and positioned in the housing in rotation sensing relation with respect to the rotor;
   wherein the rotor (14, 31, 40) is a hollow structure and includes
   axially directed inlet means positioned about the axis of rotation (18, 32) of the rotor to introduce fluid into the rotor centrally thereof, and
   circumferentially directed outlet or exit openings (24, 36, 45) are located adjacent the circumference of the rotor;
   an inlet duct (13, 35, 44) is provided directing fluid into said axially directed rotor inlet means;
   flow guide ribs (23) are located within said inlet duct (13) and extend longitudinally axially parallel to the axis of rotation of the rotor towards said axially directed inlet means;
   and wherein the rotor is located in the fluid chamber (15, 34, 41) and surrounded thereby,
   so that fluid flow will be from the inlet means, axially through the inlet duct, centrally into the rotor and out of the rotor at a position adjacent the circumference thereof, into the fluid chamber, reaction of fluid leaving the rotor through said outlet or exit openings, causing rotation of the rotor which is sensed by said sensing means.

2. Flow meter according to claim 1, further including a hub (26, 35a) formed on the rotor and extending into said inlet duct, said hub including, at least in part, said axially directed inlet means.

3. Flow meter according to claim 1, further including a rotor shaft (18);
   a hub (26, 35a) surrounding the rotor shaft, the rotor shaft being rotatably journalled with one end in said inlet duct means and with the other end in the fluid flow chamber.

4. Flow meter according to claim 1, wherein the outlets or exit openings (24, 36, 45) are directed essentially tangentially from the rotor;
   said fluid flow chamber is essentially circular and surrounds the rotor so that fluid coursing within the fluid flow chamber will have a direction of movement opposite to the direction of rotation of the rotor before leaving the fluid flow chamber through said outlet means.

5. Flow meter according to claim 1, wherein (FIGS. 4-6) the rotor (31, 40) comprises a generally T-shaped tubular structure (31a), closed off at the cross branches of the T, and wherein the outlets or exit openings (36, 45) are arranged at least approximately tangentially with respect to the axis of the rotor.

6. Flow meter according to claim 5, wherein the axially directed inlet means comprises a hollow stub (35a, 44) extending from the cross branches of the T (31a) and forming said inlet duct.

7. Flow meter according to claim 1, wherein the rotor (14) has flow directing vanes or blades (25) located therein;
   the circumferentially located outlet or exit openings comprise
   two outlet or exit openings positioned diametrically opposite each other and directed in the same circumferential direction with respect to the axis of the rotor,
   the outlet or exit openings extending in at least approximately tangential direction with respect to the rotation of the rotor;
   wherein the vanes or blades (25) extend from said axially directed inlet means centrally of the rotor to the circumferentially positioned outlet or exit openings; and
   wherein the vanes or blades (25) in the region facing said ribs are formed with inclined surfaces (25a).

8. Flow meter for measuring fuel consumption in a closed fuel circuit having a fuel supply duct adapted for connection to a fuel consumption element, particularly an internal combustion engine, and a return duct to return unused fuel to a tank, comprising
   two flow meter units, each flow meter unit including
   a housing (10, 19, 21, 30);
   a fluid flow chamber (15, 34, 41) defined in the housing;
   a rotor (14, 31, 40) located in the housing;
   inlet means (11, 11a, 12; 33, 38; 42, 43) providing flow communication of fluid to the flow chamber;
   outlet means (16, 17; 39, 46) providing fluid outlet flow communication from the chamber;
   rotation sensing means (29, 37) sensing rotation of the rotor and positioned in the housing in rotation sensing relation with respect to the rotor;
   wherein the rotor (14, 31, 40) is a hollow structure and includes
   axially directed inlet means positioned about the axis of rotation (18, 32) of the rotor to introduce fluid into the rotor centrally thereof, and
   circumferentially directed outlet or exit openings (24, 36, 45) are located adjacent the circumference of the rotor;
   an inlet duct (13, 35, 44) is provided directing fluid into said axially directed rotor inlet means;
   and wherein the rotor is located in the fluid chamber (15, 34, 41) and surrounded thereby,
   so that fluid flow will be from the inlet means, axially through the inlet duct, centrally into the rotor and out of the rotor at a position adjacent the circumference thereof, into the fluid chamber, reaction of fluid leaving the rotor through said outlet or exit openings, causing rotation of the rotor which is sensed by said sensing means;
   a common rotor shaft (32a) retaining the rotors (31, 40) of said two flow meter units, the inlet means and the outlet means (38, 39) of one of the flow meter units being connected in the supply duct and the inlet means and outlet means (42, 46) of the other flow meter unit being connected in the return duct;

and wherein the direction of rotation of the rotors, upon fluid flow in the respective flow meter units, is in respectively opposite direction, whereby the total rotation of said rotors on said common shaft (32a) will be representative of the differential flow of fluid through the supply duct and return duct, and hence a measure of fluid consumption by said consuming element.

9. Flow meter according to claim 8, wherein the housing for said flow meters is a common housing structure (30) for both said flow meter units;

and a single rotation sensing means (37) is provided, located in said housing and positioned in rotation sensing selected relation with respect to one of the rotors.

10. Flow meter according to claim 8, wherein the outlets or exit openings (36) in one rotor (31) of one of the flow meter units is facing in a direction opposite the outlets or exit openings (45) of the rotor (40) of the second flow meter unit.

11. Flow meter according to claim 8, further comprising a bypass duct (9) connected between the inlet means (11, 11a) and the outlet means (16, 17) independently of the fluid chamber (15, 34, 41) for bypassing fluid around the chamber and establishing a fluid flow path parallel to the fluid flow through the rotor within the chamber;

and a selectively, adjustably closeable, controllable orifice (8) in said bypass duct to control the amount of fluid bypassed therethrough, and hence provide for calibration of fluid flow through the rotor, and, selectively, through the bypass duct, respectively.

12. Flow meter according to claim 11, wherein said controllable orifice comprises an exit slit (8);

and a movable cover (7) forming an adjustable diaphragm selectively, adjustably changing the free cross section of said slit (8).

13. Flow meter according to claim 11, further including an enlarged entry chamber portion (11a) positioned, with respect to fluid flow, in advance of said axially directed inlet means, and having a vertically extending portion extending at least approximately up to said fluid flow chamber (15), said bypass duct (9) being connected to the upper region of said enlarged portion (11a) to permit escape of gas and vapor bubbles from the fluid and bypass thereof around the rotor.

14. Flow meter according to claim 13, further including means (7, 8) adjustably controlling the orifice of said bypass duct, while leaving a predetermined minimum opening to permit bypass of gas or vapor bubbles with respect to the rotor.

15. Flow meter having
a housing (10, 19, 21, 30);
a fluid flow chamber (15, 34, 41) defined in the housing;
a rotor (14, 31, 40) located in the housing;
inlet means (11, 11a, 12; 33, 38; 42, 43) providing flow communication of fluid to the flow chamber;
outlet means (16, 17; 39, 46) providing fluid outlet flow communication from the chamber;
rotation sensing means (29, 37) sensing rotation of the rotor and positioned in the housing in rotation sensing relation with respect to the rotor;
wherein the rotor (14, 31, 40) is a hollow structure and includes
axially directed inlet means positioned about the axis of rotation (18, 32) of the rotor to introduce fluid into the rotor centrally thereof, and
circumferentially directed outlet or exit openings (24, 36, 45) are located adjacent the circumference of the rotor;
an inlet duct (13, 35, 44) is provided directing fluid into said axially directed rotor inlet means;
and wherein the rotor is located in the fluid chamber (15, 34, 41) and surrounded thereby,
so that fluid flow will be from the inlet means, axially through the inlet duct, centrally into the rotor and out of the rotor at a position adjacent the circumference thereof, into the fluid chamber, reaction of fluid leaving the rotor through said outlet or exit openings, causing rotation of the rotor which is sensed by said sensing means;
said flow meter further comprising
a bypass duct (9) connected between the inlet means (11, 11a) and the outlet means (16, 17) independently of the fluid chamber (15, 34, 41) for bypassing fluid around the chamber and establishing a fluid flow path parallel to the fluid flow through the rotor with the chamber;
and a selectively, adjustably closeable, controllable orifice (8) in said bypass duct to control the amount of fluid bypassed therethrough, and hence provide for calibration of fluid flow through the rotor, and, selectively, through the bypass duct, respectively.

16. Flow meter according to claim 15, wherein said controllable orifice comprises an exit slit (8);

and a movable cover (7) forming an adjustable diaphragm selectively, adjustably changing the free cross section of said slit (8).

17. Flow meter according to claim 16, wherein the housing (10, 19, 21) comprises a first housing portion (19) and a second housing portion (21) rotatable with respect to said first housing portion;

said cover forming a cover strip (7) secured to the second housing portion to provide for adjustment of the slit (8) upon rotation of the second housing portion (21) with respect to the first housing portion, and hence adjsutment of fluid bypassed around the rotor.

18. Flow meter according to claim 15, further including an enlarged entry portion (11a) positioned, with respect to fluid flow, in advance of said axially directed inlet means, and having a vertically extending portion extending at least approximately up to said fluid flow chamber (15), said bypass duct (9) being connected to the upper region of said enlarged portion (11a) to permit escape of gas and vapor bubbles from the fluid and bypass thereof around the rotor.

19. Flow meter according to claim 18, further including means (7, 8) adjustably controlling the controllable orifice of said bypass duct, while leaving a predetermined minimum opening to permit bypass of gas or vapor bubbles with respect to the rotor.

20. Flow meter according to claim 15, further including flow guide ribs (23) located within said inlet duct (13) and extending longitudinally axially parallel to the axis of rotation of the rotor towards said axially directed inlet means.

* * * * *